United States Patent [19]

Klaus

[11] 4,093,083
[45] June 6, 1978

[54] APPARATUS FOR STACKING AND UNSTACKING SHEET MATERIAL, MORE PARTICULARLY GLASS SHEETS

[75] Inventor: Karl-Heinz Klaus, Cologne, Germany

[73] Assignee: Spiegelglaswerke Germania, Zweigniederlassung der Glaceries de Saint.Roch S.A., Cologne, Germany

[21] Appl. No.: 823,125

[22] Filed: Aug. 9, 1977

Related U.S. Application Data

[63] Continuation of Ser. No. 676,334, Apr. 12, 1976, abandoned.

[30] Foreign Application Priority Data

Apr. 17, 1975 Germany .............................. 2516884
Mar. 29, 1976 Germany .............................. 2613322

[51] Int. Cl.² ............................................. B65G 57/28
[52] U.S. Cl. ..................................... 214/7; 214/8.5 D; 271/103; 271/194
[58] Field of Search ...................... 214/6 FS, 7, 8.5 D; 271/103, 107, 194, 181

[56] References Cited

U.S. PATENT DOCUMENTS

| | | | |
|---|---|---|---|
| 2,049,850 | 8/1936 | Lytle et al. | 214/8.5 D X |
| 3,326,547 | 6/1967 | Walters et al. | 214/7 X |
| 3,542,241 | 11/1970 | Middleditch | 214/8.5 D X |
| 3,679,073 | 7/1972 | Malburet | 214/8.5 D X |
| 3,679,076 | 7/1972 | Miller et al. | 214/7 X |
| 3,757,966 | 9/1973 | Cox et al. | 214/6 FS X |

Primary Examiner—L. J. Paperner
Attorney, Agent, or Firm—Price, Heneveld, Huizenga & Cooper

[57] ABSTRACT

The specification describes an apparatus for stacking and unstacking sheet material, more particularly glass sheets, comprising one or more suction plates, capable of moving towards a sheet material stack and adapted to be moved by a pressure cylinder actuator, and with a sensing member, which on making contact with the stack, the surface position of which changes as the stacking or unstacking progresses generates a pulse adapted to control movement of the piston rod of the pressure cylinder actuator. As a sensing member a switch (vacuum monitor, pressure monitor) responsive to changes in pressure is provided in the suction duct system of the suction plates and/or in the pressure duct system of the pressure cylinder actuator.

6 Claims, 3 Drawing Figures

4,093,083

APPARATUS FOR STACKING AND UNSTACKING SHEET MATERIAL, MORE PARTICULARLY GLASS SHEETS

This is a continuation of application Ser. No. 676,334, filed Apr. 12, 1976, now abandoned.

BACKGROUND OF INVENTION

1. Field to which Invention Relates

The present invention relates to an apparatus for stacking and unstacking sheet material, more particularly glass sheets, comprising one or more suction plates, capable of moving towards a sheet material stack the position of the surface of which changes as the sheets are stacked or unstacked, which apparatus is adapted to be moved by a pressure cylinder actuator, and with a sensing member, which on making contact with the stack, generates a pulse adapted to control the piston rod of the pressure cylinder actuator.

2. The Prior Art

Forms of apparatus of this type are used for example for the stacking and unstacking of glass sheets or panes when the glass sheets are placed individually in production premises on a horizontal conveyor and are stacked on a stack standing generally vertically or when the glass sheets are removed individually from the stack.

Since the height of the sheet stack is changed with the stacking of every new sheet, the suction plate or, respectively, the frame or arm carrying the suction plate or plates must travel through a distance which is continuously changing. In the case of previously proposed stacking apparatus the above-mentioned sensing member serves for controlling this distance travel. For this purpose mechanical sensors or feelers have been used, for example in the form of limit switches, which on contact with the sheet surface provide the control pulse. Apparatus of this type is described for example in the German Patent Specifications (Offenlegungsschriften) Nos. 2,130,591 and 2,130,592 and the German Patent Specification (Auslegeschrift) No. 1,155,396.

The limit switches or other mechanical feelers are arranged in the case of the known apparatus in such a manner that they either make contact with the uppermost glass sheet themselves or that they are actuated by the frame carrying the suction plates and in this case the frame is mounted in a yielding manner on the arm carrying the frame so that owing to the relative movement between the suction frame lying against the glass sheet stack and the supporting arm actuation of the end switch becomes possible. In both cases it may be that the mechanical feeler becomes loose or owing to unintentional external action is caused to change its position. The consequence of this will be that the relationship between the position of the feeler and the position of the suction plates is no longer the optimum position just at that instant in which the control pulse for engagement and backward movement of the suction plates is generated so that disfunction of the apparatus may occur. Furthermore, in the case of previously proposed forms of apparatus other causes may lead to the suction plate not making reliable engagement with the sheet to be removed but nevertheless the sensing member generates the control pulse so that for this reason as well disfunction is unavoidable.

SUMMARY OF INVENTION

One aim of the present invention is that of constructing an apparatus of the described type in such a manner that disfunction owing to unintended displacement of the sensing member are excluded and that simultaneously the control pulses are generated with a high degree of reliability and with optimum timing.

In accordance with the invention this aim is to be achieved in that as a sensing member a switch responding to pressure changes (vacuum monitor, pressure monitor) is provided in the vacuum duct system of the suction plates and/or in the pressure duct system of the pressure cylinder actuator.

In accordance with a stacking device constructed in accordance with the invention the suction plate engaging the uppermost sheet, for example, is connected with the vacuum source even before it draws up to the sheet stack and the vacuum resulting on full contact of the suction plate or of the suction plates respectively with the uppermost sheet in the duct system is detected by a vacuum monitor, which generates the pulse for termination of forward movement of the piston rod carrying the suction plate or plates. In this manner it is possible to ensure reliably that the control pulse is precisely timed with the instant of engagement of the suction plates with the sheet. Faults in the course of movement, which could be produced by the generation by the sensing member of the control pulse without it being ensured that the suction plate has made reliable engagement with the sheet, can therefore no longer occur.

The switch responding to pressure changes can be arranged as a pressure monitor or pick up in the pressure duct, bringing about the forward movement of the piston rod, of the pressure cylinder actuator. Accordingly owing to the pressure monitor the increase in pressure arising on engagement of the suction plate or, respectively, of the glass sheet carried by the suction plate on the stack in the pressure duct of the pressure cylinder actuator is detected and as a result the pulse is generated for the control or actuation of the pressure cylinder actuator.

LIST OF SEVERAL VIEWS OF DRAWINGS

The invention will now be described in detail with reference to preferred embodiments shown in the accompanying drawings.

DESCRIPTION OF PREFERRED EMBODIMENTS

Figure 1:
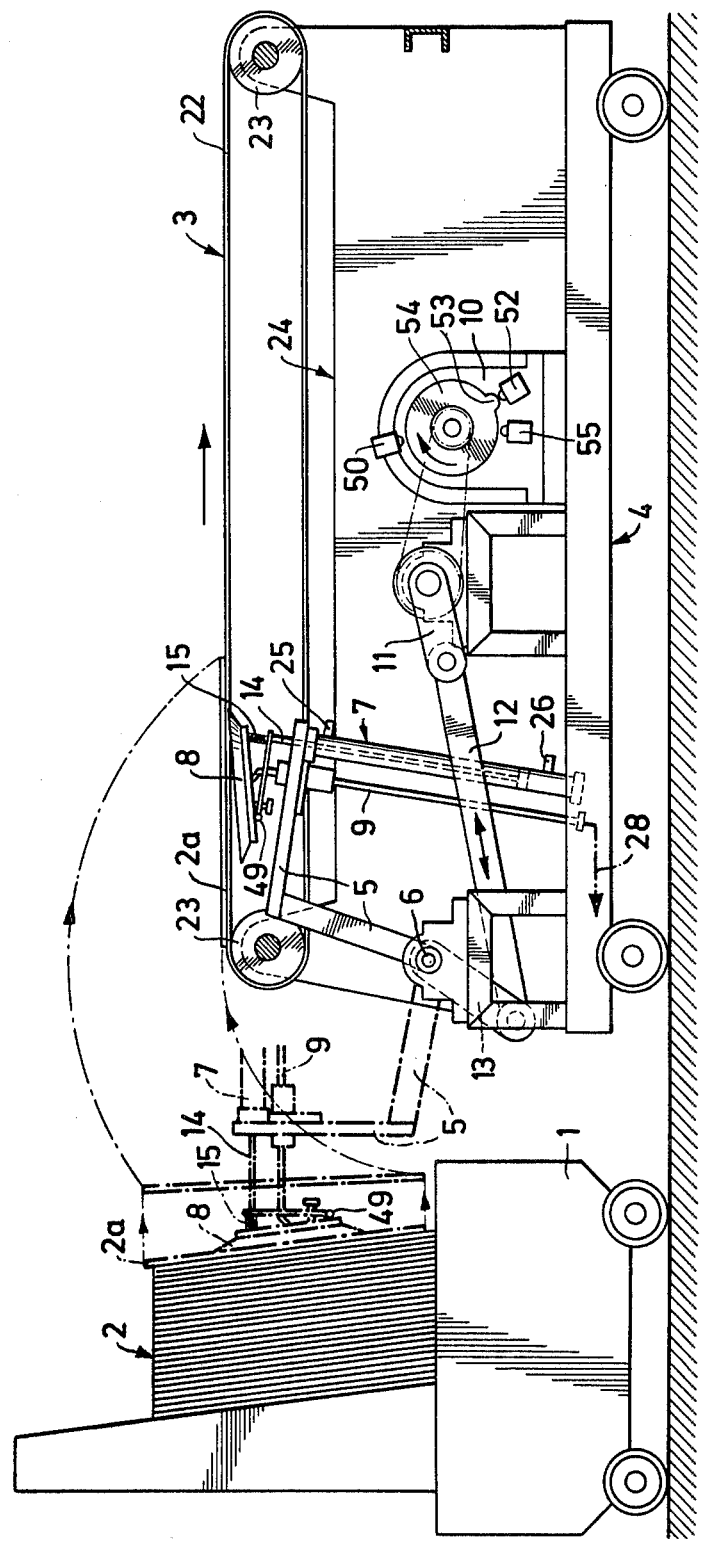
FIG. 1 shows a general view of the novel stacking apparatus as regards its mechanical structure.
Figure 2:
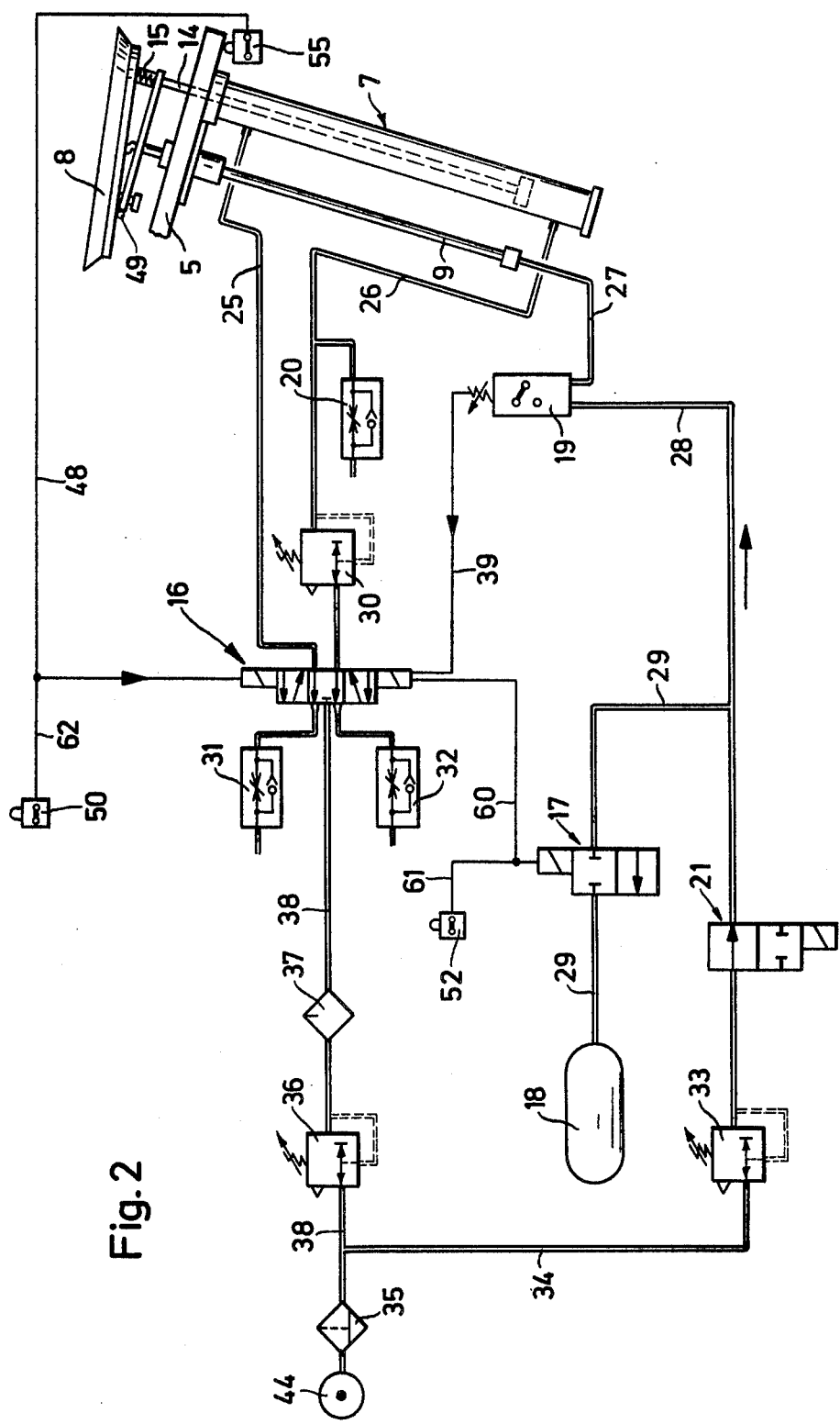
FIG. 2 is a diagrammatic representation of the manner of operation of the novel apparatus with a vacuum monitor or pick up in the vacuum duct of the suction plates, in the form of a block diagram.

The apparatus as shown in FIG. 1 will firstly be described as one for carrying out removal from a stack. On the stand trolley 1 there is a slightly sloping stack 2 of glass sheets 2a, which are to be deposited one by one on the horizontal conveyor 3. The sheet unstacking apparatus, provided for the removal of the individual glass sheets 2a comprises the stand 4, on which the angled arm 5 is arranged for pivotal movement about the shaft 6. On the arm 5 the pneumatic cylinder actuator 7 is arranged, whose piston rod 14 moves the suction plate 8 to and fro. The guide rod 9 serves simultaneously as a vacuum duct, with which the suction plate 8 is connected with the vacuum container 18 (FIG. 2). The pivotal movement of the pivoting arm 5 is initiated by the geared motor 10, which transmits the rotary movement to the crank 11. The thrust rod 12 transmits the movement to the crank 13, which is connected via the shaft 6 with the arm 5 in such a manner as to prevent relative pivotal movement between these parts.

In the right-hand end position, in which the operating cam 53 actuates the limit switch 55, the glass sheet 2a held by the suction plate is deposited on the horizontal conveyor 3. The horizontal conveyor is in the form of a flat bed conveyor with belts 22, the guide rollers 23 and the frame 24 so that the arm 5 with the suction plate 8 can move between the conveyor belts 22. In the left-hand receiving position shown in broken lines the uppermost glass sheet 2a of the stack 2 is engaged by the suction plate 8. For this purpose, as soon as the arm 5 has reached its end position on the left, via the limit switch 50 actuated by the operating cam 53 and the multi-way valve 16 the pneumatic cylinder 7 is actuated so that the suction plate 8 moves in a horizontal direction towards the stack 2. As soon as the suction plate 8 has reliable engaged the uppermost glass plate 2a, the movement to the rear indicated by the arrows is started. The suction plate 8 is itself not rigidly fixed in its holder and instead is carried in a yielding manner (using the spring 15 and the joint 49) so that it can be tilted in all directions freely to allow a small angular movement. Consequently it can make sealing engagement without any forcible displacement being required even if the slope of the glass plates 2a should not always be the same.

As will be seen from FIG. 2, in which the pneumatic cylinder 7 is shown in its right-hand end position, the advance of the pneumatic cylinder 7 is controlled using a pressure force 44, a duct 38, which has the pressure reducing valve 36 and the oiler 37 connected in it, and the ducts 25 and 26 and finally the valve 16. In the duct 26 a pressure reducing valve 30 is connected having a built-in pressure gauge, while the throttle check valves 31 and 32 serve for venting the ducts 25 and 26 and simultaneously serve to ensure the retention of a defined residual pressure in the cylinder on both sides of the piston in it "halt"-position. Simultaneously with the actuation of the valve 16 for the forward movement of the suction plate 8 against the glass plate stack 2 via the signal line 60 and the multi-way valve 17 the vacuum circuit 9, 29, 28, 29, and 19 is opened so that the suction plate 8 becomes connected with the vacuum container 18. When the suction plate 8 has become applied against the glass surface, vacuum becomes established in the duct system. The vacuum monitor 19 responds to the vacuum which becomes established since it is connected in the duct system. By means of the electrical contact in the vacuum monitor 19 via the signal line 39 the multi-way valve 16 is reversed to stop the advancing movement of the piston rod 14 of the cylinder 7 and backward movement is initiated. The speed of reverse movement of the suction plate 8 can be set via the throttle check valve 20. After a short delay the rotary movement of the arm 5 is then started. Shortly before the glass plate 2a reaches the horizontal conveyor 3 via the switch 52, actuated by the switch cam 53, and the signal line 61 the valve 17 is closed and the vacuum is thus switched off and simultaneously via the solenoid valve 21 and the pressure reducing valve 33, the duct 34 and the filter 35 with a water trap the suction plate 8 is connected with compressed air so that the glass plate 2a becomes detached from the suction plate and is received by the conveyor 3.

Figure 3:
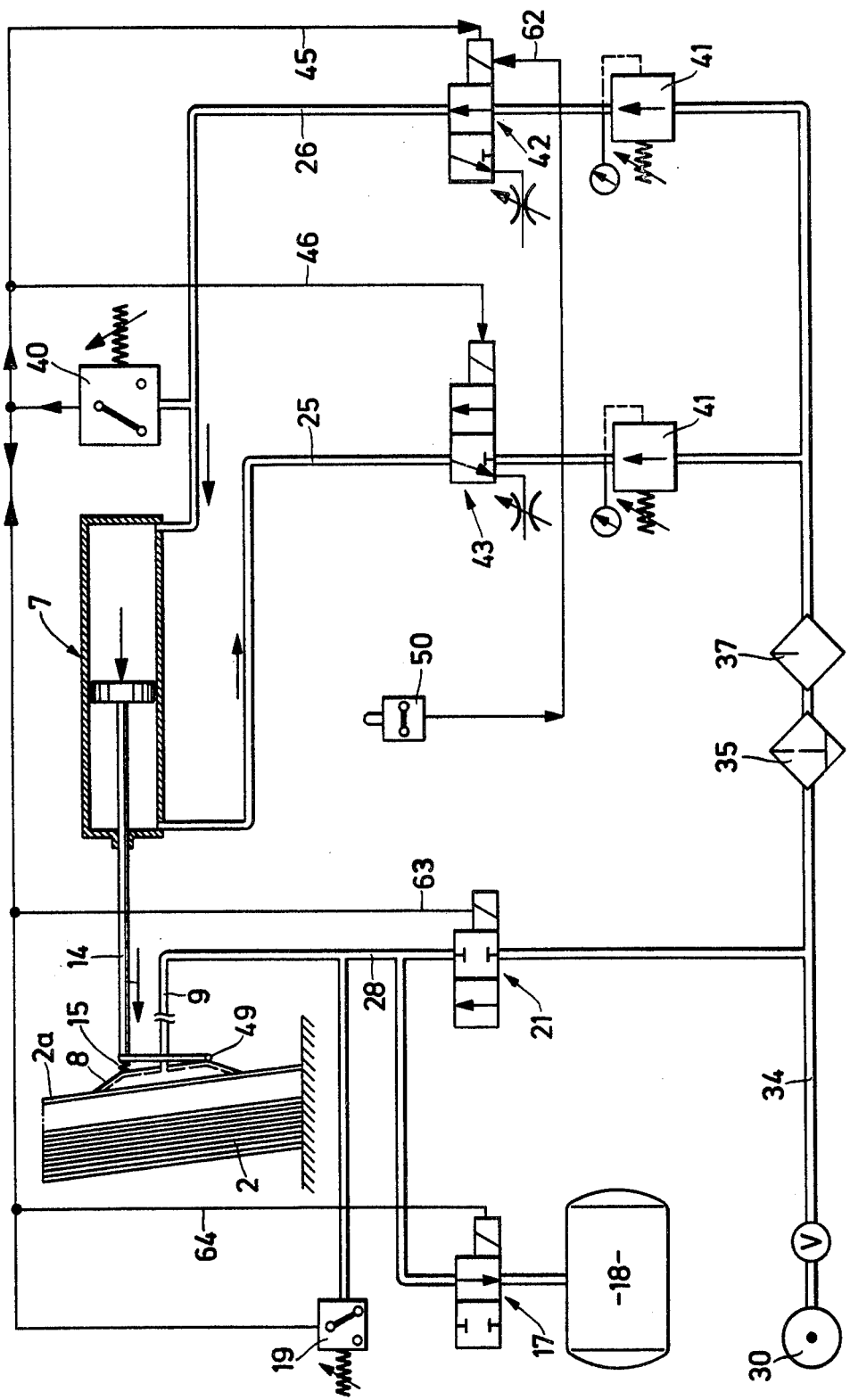
FIG. 3 is a diagrammatic representation of a manner of operation of the new apparatus with a pressure monitor or pick up in the pressure duct of the pressure cylinder actuator, also represented in the form of a block diagram.

The apparatus represented in FIG. 1 can however also serve to stack glass plates 2a, which arrive on a horizontal conveyor 3, on the stand trolley 1 to form a stack 2. In this case in lieu of a vacuum monitor in the duct system of the suction plate 8 a pressure monitor is provided in the pressure duct system of the pressure cylinder. As will be gathered more particularly from FIG. 3 during the forward movement of the piston rod 14 a pressure becomes established in the pressure line 26, which is substantially equal to the frictional resistance in the pressure cylinder 7. As soon as the piston rod 14 senses a resistance due to the stack at the instant of engagement of the glass plate 2a with the stack, the pressure in the pressure duct or line 26 increases and it would ultimately reach the value which is set at the pressure reducing valve.

The pressure monitor 40 connected with the pressure line 26 measures this increase in pressure, which becomes established when the piston rod 14 engages the glass plate stack 2, in the line. At the pressure monitor 40 that pressure is set, on reaching which the plate is deposited and the piston rod 14 is to be driven back into its starting position. When this pressure set at the pressure monitor 40 has been reached, the pressure monitor 40 reverses the multi-way valve 42 by means of an electric following control system (not shown) and a signal line 45 so that the forward movement of the piston rod 14 is interrupted. Following this via the electrical following control system and the signal line 46 the multi-way valve 43 is actuated so that the backward movement of the piston 14 is started via the pressure line 25.

On the other hand, by means of the pressure monitor 40 and the signal lines 63, 64 the multi-way valves 21 and 17 are switched in the line system 28 leading to the suction plate 8 so that owing to the valve 17 the connection with the vacuum chamber 18 is interrupted and by means of the valve 21 the line 28 is connected with the pressure source 30 and the pressure line 34 is placed under gauge pressure for a short time so that the glass sheet 2a is released from the suction plate 8.

The pressure monitor 19 in the line system 28, whose function has been described in detail with reference to FIG. 2, ensures that the movement to the rear of the piston rod 14 only starts, on engagement of a glass plate by the suction plate 8, when the vacuum set at the pressure monitor 19 has actually become established in the line 28, that is to say when the glass plate is reliably engaged.

Satisfactory results are obtained in the case of an embodiment of the invention if at the pressure reducing valve 41 a pressure of approximately 2 atmospheres gauge is set while at the pressure monitor 40 a pressure of approximately 1.3 atmospheres gauge is set. The pressure, which becomes established during the forward movement of the piston rod 14 in the duct 26 amounts to approximately 0.5 atmosphere gauge, this pressure being due to frictional resistance in the system.

I claim:

1. In an apparatus for adding to and removing glass sheets from a stack of glass sheets arranged in vertically inclined position, one upon another, the apparatus having a pivotally mounted arm with a free end, means for reciprocating said arm between advanced and retracted positions, a pneumatic cylinder mounted on said arm adjacent said free end and having a telescoping piston rod and a vacuum plate mounted on said rod, means for supplying air under pressure to said cylinder to thereby shift said piston rod and means for evacuating said vacuum plate, means for accommodating variations in spacing between the face of the stack of sheets and the limit of travel of said arm toward the face of said stack, the spacing between said arm and the face of said stack changing from sheet to sheet; said accommodating means including a first pressure sensitive sensor means communicating with said vacuum plate for reading the magnitude of the vacuum established therein when said vacuum plate engages a sheet; a second pressure sensitive sensor means communicating with said pneumatic cylinder for reading the change in pressure when forward movement of the piston encounters resistance of a magnitude in excess of a predetermined value; said first and second sensor means limiting the outward extension travel of said piston rod and preventing said piston rod from exerting excessive pressure against the glass sheets.

2. An apparatus as described in claim 1 wherein said cylinder is double acting; a reversing valve is provided in the pneumatic supply line for said cylinder; said first sensor and said reversing valve being interconnected whereby said reversing valve is actuated to reverse the direction of movement of said piston upon said first sensor means detecting a vacuum of a predetermined magnitude.

3. An apparatus as described in claim 1 wherein means are provided for establishing a predetermined maximum working pressure for the air supplied to the cylinder while the piston is being advanced, a valve controlling the supply of air to said cylinder; said second sensor means being connected to said valve and actuating said valve to close upon said second sensor means sensing a pressure increase in excess of said predetermined maximum whereby extension of said piston rod is stopped.

4. An apparatus as described in claim 1 wherein a conveyor is provided, said conveyor having a pair of spaced conveyor tracks, one on each side of said pivoted arm, said conveyor tracks having their upper surfaces in a common plane; as said pivot arm approaches the limit of its retraction movement away from the stack of sheets, said vacuum plate passing between said conveyor tracks and below said plane of said tracks for receiving from or depositing sheets on said conveyor.

5. An apparatus as described in claim 4 wherein stop switches limit the pivotal movement of said arm to an identical arc of travel at all times irrespective of the spacing of the stack of sheets from said arm; the switch limiting advance movement of said arm initiating the creation of the vacuum in said vacuum plate when it terminates advance of said arm.

6. An apparatus as described in claim 5 wherein a contact switch terminates the vacuum in said vacuum plate as said vacuum plate passes between said conveyor tracks during retraction movement and connects said vacuum plate with said air supplying means.

* * * * *